United States Patent [19]
Schuldenfrei

[11] 4,056,376
[45] Nov. 1, 1977

[54] AIR FILTER

[75] Inventor: Raymond E. Schuldenfrei, Los Angeles, Calif.

[73] Assignee: Brunswick Corporation, Skokie, Ill.

[21] Appl. No.: 631,816

[22] Filed: Nov. 14, 1975

[51] Int. Cl.² ............................................. B01D 39/08
[52] U.S. Cl. ..................................... 55/497; 55/514; 55/521; 210/493 R; 156/293
[58] Field of Search ................................. 55/497–500, 55/521, 481, 514; 210/493, 445, 446, 451; 156/293

[56] References Cited

U.S. PATENT DOCUMENTS

| 3,494,466 | 2/1970 | Rose et al. ........................... 210/493 |
| 3,778,985 | 12/1973 | Daigle et al. ........................... 55/521 |

FOREIGN PATENT DOCUMENTS

| 599,661 | 6/1960 | Canada .................................. 210/493 |
| 1,022,232 | 3/1966 | United Kingdom .................... 55/521 |

Primary Examiner—Bernard Nozick
Attorney, Agent, or Firm—John G. Heimovics; David S. Guttman; Sheldon L. Epstein

[57] ABSTRACT

A fluid filter and a method for making it. The filter comprises a one-piece container having one open surface, a pleated filter element fitting in the container, and a cover fitting over the container's open surface. A trough in the container receives and positions three side edges of the filter element, and a mating channel in the cover receives and positions the element's remaining side edge. Fluid tight seals secure the four edges of the filter element in the trough and channel and secure the cover to the container.

4 Claims, 27 Drawing Figures

U.S. Patent    Nov. 1, 1977    Sheet 1 of 4    4,056,376
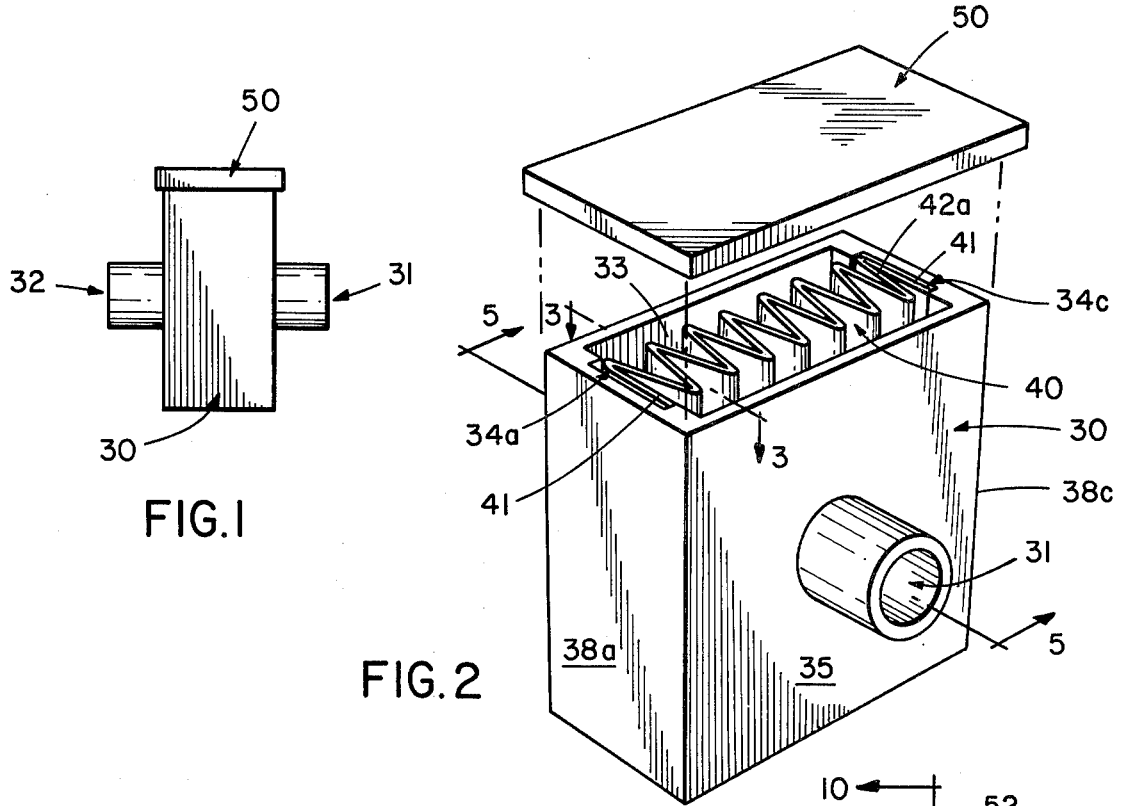
FIG.1
FIG.2
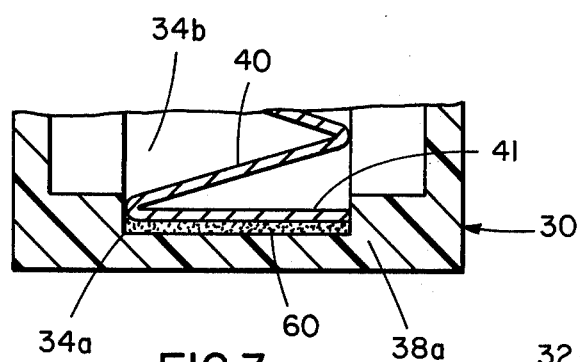
FIG.3
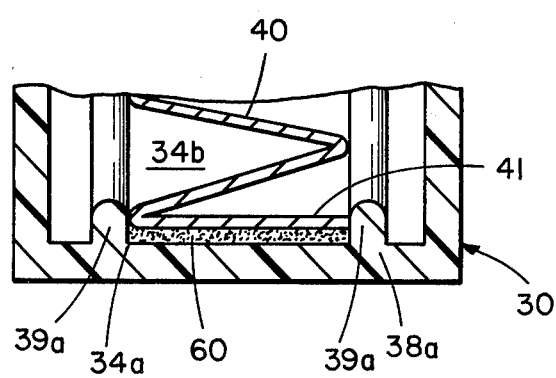
FIG.4
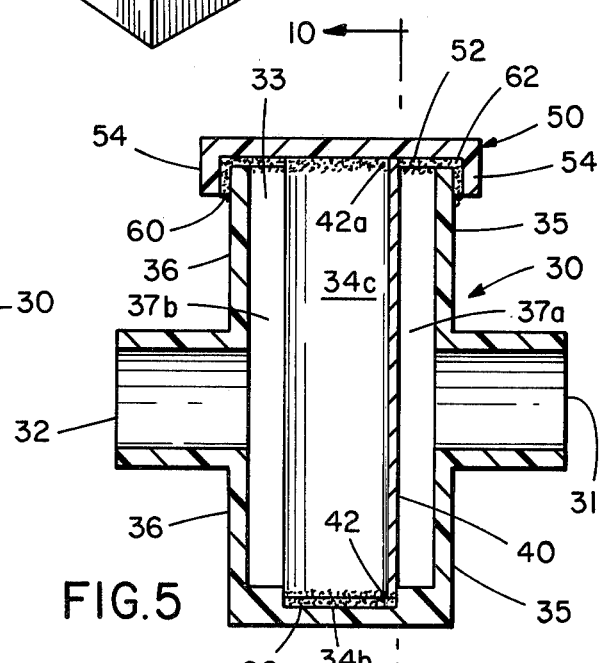
FIG.5
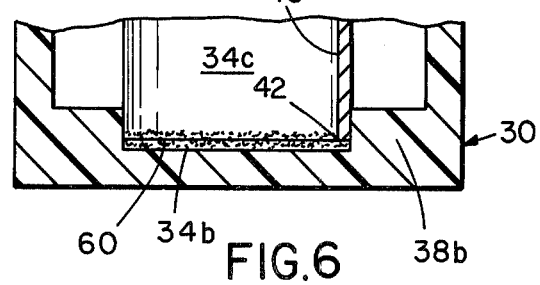
FIG.6

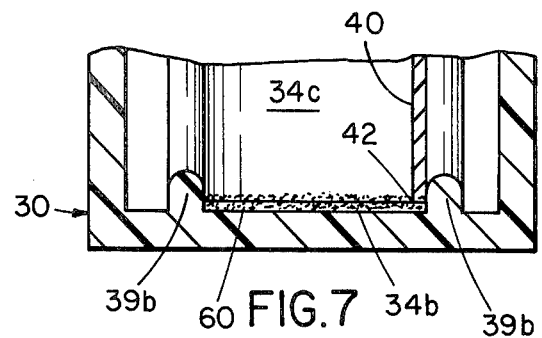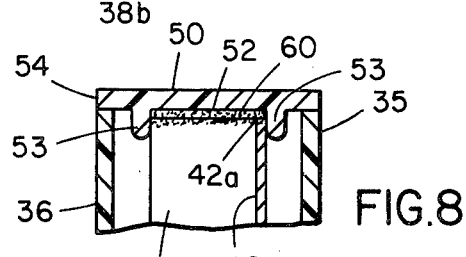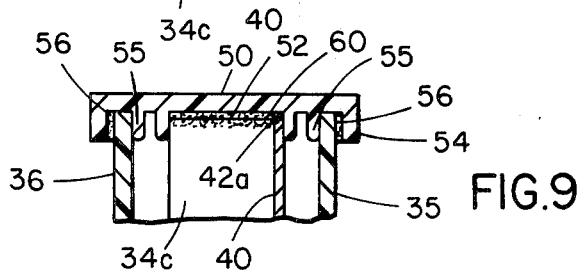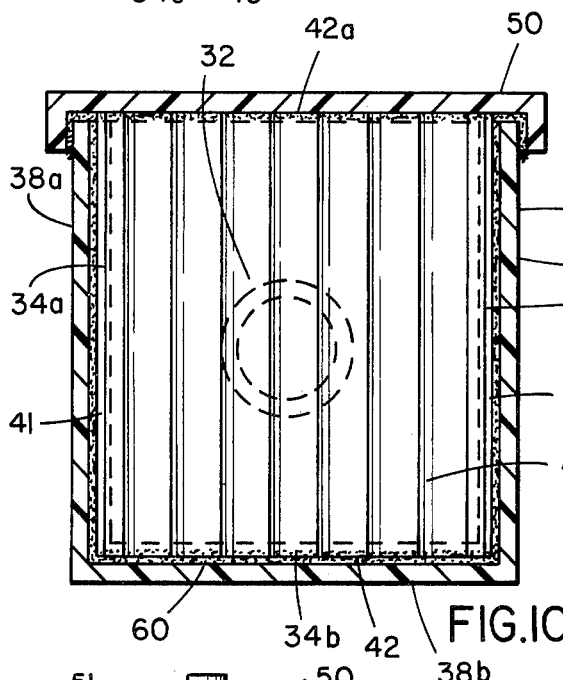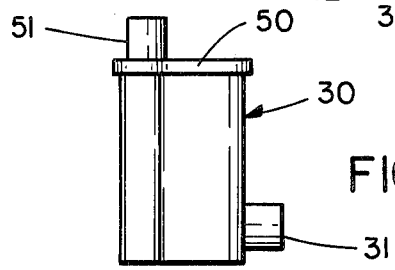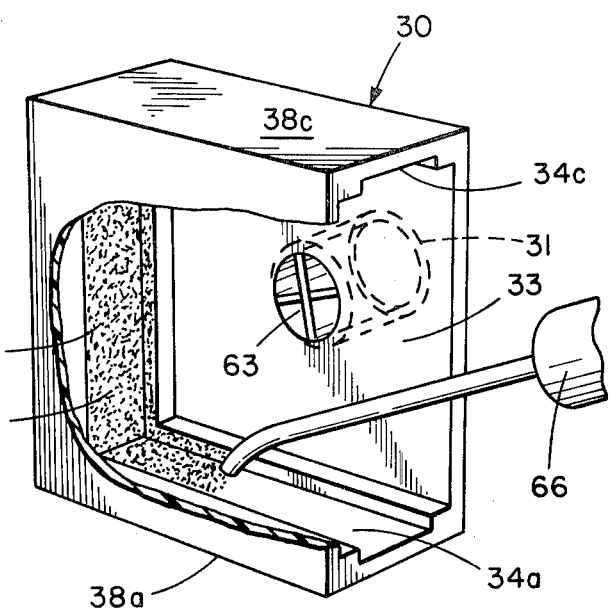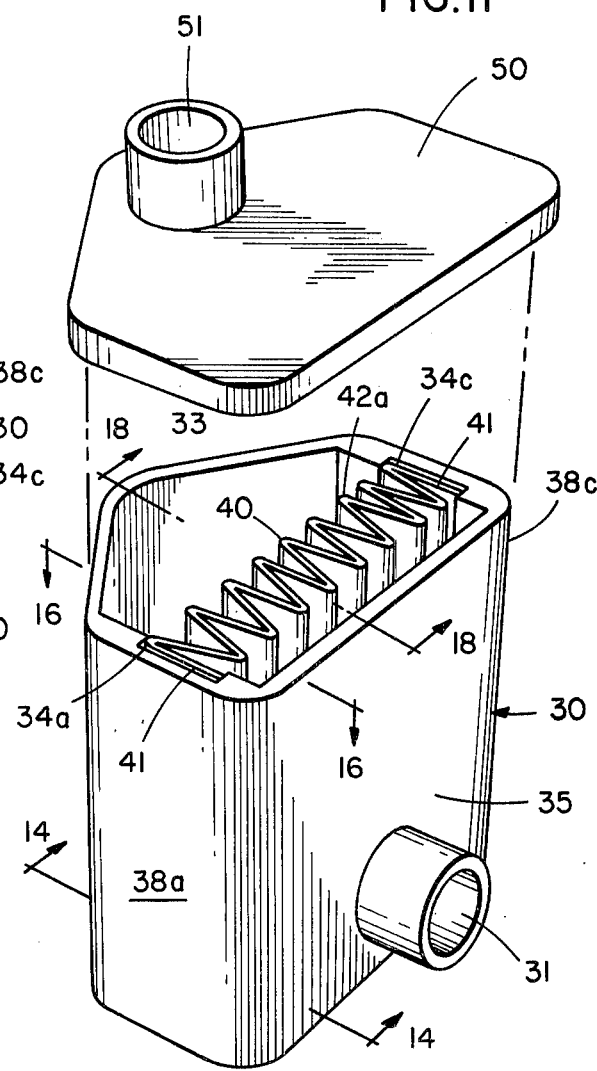

AIR FILTER

BACKGROUND OF THE INVENTION

1. Field of the Invention

This invention is in the field of air filters and, more specifically, in the field of air filters used for medical and therapeutic purposes.

2. Description of the Prior Art

Current inhalation therapy procedures often require filtration of the air administered to a patient. The filters used must be autoclavable for sterilization and/or disposable for avoiding patient-to-patient contamination. Users also want the pressure-drop across a filter be small (even at high capacity) while the total physical size of the filter remains small.

When a filter designer attempts to meet all these criteria, he may find that they actually work against each other. For example, to squeeze a lot of filter surface into a compact container, the filter designer may choose an accordian shaped pleated filter media, but then sealing the unusual zigzag shaped edges of the pleated filter media at a low cost is a problem. One solution to the problem of sealing a pleated filter media in a container was found by Rose et al., U.S. Pat. No. 3,494,466, where foils of thermoplastic material were heatsealed to the edge of the material and then a ring of adhesive material was used to seal the foil wrapped filter to the container wall. Another type of filter invented by Gronholz, U.S. Pat. No. 3,712,033, seals the end pleats of a pleated filter media by means of a clamp formed from a slot, an upstanding member, and a rigid screen end. Then, a hot melt adhesive is used to seal the filter's zigzag sides to end caps. Daigle et al. developed an improvement of the Gronholz's filter, U.S. Pat. No. 3,778,985, which uses a specially formed flexible panel end in place of Gronholz's rigid screen for clamping. Clamping the end pleats of a pleated filter media is also a characteristic of a patent to Rosenberg, U.S. Pat. No. 3,815,754; once the end pleats are clamped in place, they are permanently sealed by a weld or bond and then an end cap is welded or bonded to each zigzag edge of the filter.

These filters represented a limited advance over the prior art filters of their day, but the rising cost of materials and labor for medical products has created an urgent need for an air filter of even simpler construction requiring fewer manual steps for its assembly without sacrificing quality or filter efficiency.

SUMMARY OF THE INVENTION

The present invention provides a novel construction and method of assembly for air filters that reduces assembly cost without sacrificing quality. A filter container is provided having one open side and at least one port. Integral with the inner walls of the container is a U-shaped trough in which a sealant is deposited just before inserting in the trough a three-dimensional pleated filter element having two planar side edges and upper and lower zigzag side edges. The sealant seals three edges of the filter media element to the container, so that assembly of the filter can be completed merely by sealing a cover to both the container (across the container's open side) and the fourth side edge of the filter element, the cover having a channel mateable with the U-shaped trough. The container has at least one port, but whether a second port is in the cover or on another wall of the container depends on the orientation of the pleated filter media element within the container. A grate may be provided across the ports to reduce the possibility that the media may be punctured by an object inserted in one of the ports.

An object of the present invention is to produce an air filter having a reduced number of parts and simplified construction by providing a two-piece housing adapted to receive and position a pleated filter media element.

Another object of this invention is to provide a novel two-piece filter housing comprising a container and a cover, the container having an integral trough for receiving and positioning three side edges of a pleated filter media element; the cover having an integral channel mateable with the trough for receiving and positioning the remaining side edge of the pleated filter media element.

Another object of this invention is to provide a filter assembly method having a minimum number of manual assembly steps by providing a container adapted to receive a sealant in an integral trough, a cover for the container adapted to receive a sealant in an integral channel mateable with the trough, and a pleated filter media adapted to be received, positioned, and sealed on three edges merely by insertion in the sealant-lined trough and received, positioned and sealed on its fourth side edge by the sealant-lined channel.

Another object of this invention is to produce filters of the above trough-channel construction having a variety of configurations, some with both inlet and outlet ports on the walls of the container, some with only an inlet or an outlet port on the cover and another port on one of the walls of the container, etc., so that a great variety of possible configurations for filter use will be available.

A feature of this invention is the provision of a grate on one or more ports of the filter for reducing the possibility that the filter media will be punctured by an object inserted into the port.

Other objects, advantages, and novel features of the present invention will become apparent from the following detailed description of the invention when considered in conjunction with the accompanying drawings.

BRIEF DESCRIPTION OF THE DRAWINGS

FIG. 1 is a side elevation of a first embodiment of my filter;

FIG. 2 is an isometric view of the filter of FIG. 1.

FIG. 3 is a partial section of the filter of FIG. 2 in the direction indicated by 3—3;

FIG. 4 shows another embodiment of the section of FIG. 3;

FIG. 5 is a section of the filter of FIG. 2 in the direction indicated by 5—5;

FIG. 6 is an enlarged view of the bottom portion of the section shown in FIG. 5;

FIG. 7 shows another embodiment of the section of FIG. 6;

FIG. 8 shows another embodiment of the top portion of the section shown in FIG. 5;

FIG. 9 shows another embodiment of the top portion of the section shown in FIG. 5;

FIG. 10 is a section of the filter of FIG. 5 in the direction indicated by 10—10;

FIG. 11 is a cutaway isometric view showing the application of a sealing compound to the container portion of the filter of FIG. 2;

FIG. 12 is a side elevation of another embodiment of my filter;

FIG. 13 is an isometric view of the filter of FIG. 12;

PREFERRED EMBODIMENTS OF THE INVENTION

Figure 14:
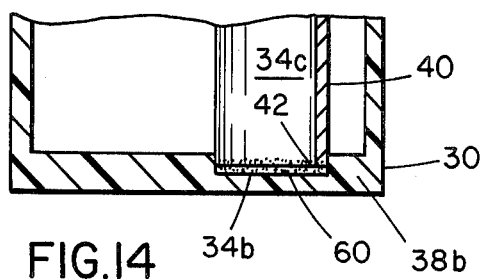
FIG. 14 is a partial section of the filter of FIG. 13 in the direction indicated by 14—14.
Figure 15:
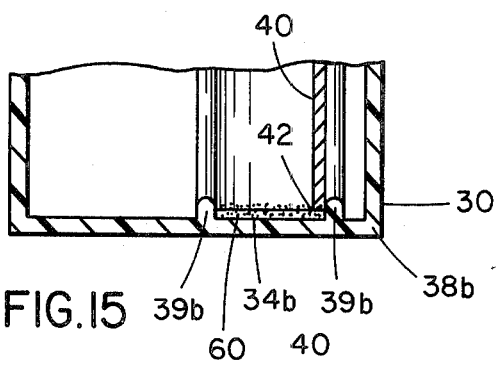
FIG. 15 shows another embodiment of the section of FIG. 14.

FIG. 1 shows a first embodiment of my invention in which a container 30 having a first port 31 and a second port 32 and is capped with a cover 50. FIG. 2 shows that inside the container is a pleated filter media 40 whose geometry causes it to have two flat planar side edges 41 and two zigzag side edges 42; only one zigzag side edge 42a, is shown in FIG. 2, but both 42 and 52a can be seen in FIGS. 5 and 10.

FIG. 10 shows that a trough composed of a left trough section 34a, bottom trough section 34b and right trough section 34c is formed within container 30. Pleated filter media 40 is placed within the trough sections 34a, 34b, and 34c so that left and right trough sections 34a and 34c each accommodate one of the flat planar side edges 41 of the pleated filter media 40 while bottom trough section 34b accommodates the bottom zigzag side edges 42. As can be seen in FIG. 2, the upper or top zigzag side edge 42a of the pleated filter media 40 is directed toward the container's open surface 33.

FIG. 3 shows in greater detail how left trough section 34a can be formed by making a recess in left container wall 38a. Flat planar side edge 41 of pleated filter media 40 is sealed to left trough section 34a by sealing means 60, which may be a glue or hot melt composition appropriate for the intended environment of the filter.

FIG. 4 shows an alternate construction of left trough section 34a formed by two protruding left channel moldings 39a directed inward from left container wall 38a. Right trough section 34c of FIGS. 2 and 10 (functionally the mirror image of trough section 34a) can be formed mutatis mutandis in a manner similar to that shown in FIGS. 3 or 4 for left trough section 34a.

FIG. 5 shows how a flow of fluid between first port 31 and second port 32 must pass through the pleated filter media 40, the two zigzag side edges 42 and 42a of pleated filter media 40 being sealed respectively to container bottom trough section 34b and to channel 52 of cover 50 by sealing means 60.

The enlarged view of FIG. 6 shows in greater detail how bottom trough section 34b can be formed by a recess in bottom container wall 38b. An alternate construction for bottom trough section 34b is shown in FIG. 7; this construction forms bottom trough section 34b by means of bottom channel moldings 39b extending inward from bottom container wall 38b.

Attention is next drawn to cover 50 of FIG. 5 which because of overhanging cover edges 54 may be said to form a cover channel 52; when channel 52 is filled with sealing means 60 and cover 50 is mated with the open surface 33 of container 30 the sealing means 60 in channel 52 seals both top zigzag side edge 42 to cover 50 and cover 50 to the container's open surface 33.

An alternate configuration for cover 50 is shown in FIG. 8 where channel 52 accommodating top zigzag side edge 42a is formed from cover moldings 53. In this embodiment cover edges 54 do not overhang container walls 35 and 36 so that a seal between cover edges 54 and container walls 35 and 36 must be effected by a separate step, such as thermal bonding, ultrasonic welding, or the like.

FIG. 9 shows yet another embodiment of cover 50 in which a second set of cover moldings 55 define an outer sealing channel 56 for holding sealing means 60 for sealing cover 50 to container walls 35 and 36. The cover construction of FIG. 9 may be more desirable than the one shown in FIG. 5 when the distance between the pleated filter media 40 and container walls 35 and 36 is so large that it would be wasteful or impractical to use the single channel construction shown in FIG. 5.

Referring to my method of assembling this new filter, it is simplicity itself. A container 30 with a trough section 34a, 34b, and 34c as shown in FIG. 11 is provided, for example, by a simple molding process, and then a suitably shaped applicator snout 66 is used to apply sealing means 60 (in a gooey state) to trough sections 34a, 34b, and 34c. The pleated filter media 40 is dropped in container 30 so that left and right trough sections 34a and 34c each accommodate a flat planar side edge 41 of pleated filter media 40 and bottom trough section 34b accommodates one of the zigzag side edge 42. This last step seals pleated filter media 40 into the container on three sides. Next, cover 50, such as that shown in FIG. 5, is inverted and its channel 52 filled with sealing means 60 (such as an appropriate glue or hot melt) and container 30 (housing pleated filter media 40) is also inverted and mated with cover 50 so that top zigzag edge 42a is sealed to cover 50 by sealing means 60; if the cover is of the construction shown by FIG. 5 or 9 this last step both seals the remaining flat planar side edge 41a to cover 50 and cover 50 to container walls 35 and 38a and 38c. Thus, my method is composed of as few steps as providing an appropriately shaped container 30, depositing sealing means 60 in a three sided trough in the container, dropping in a pleated filter media 40, filling a cover channel 52 with a sealing means 60, and joining the cover and the container to effect both a container wall-cover seal and a filter edge-cover seal.

A second major embodiment of my filter is shown in FIGS. 12 through 21. In this embodiment only the first port 31 is formed in container wall 35, a second port 51 being formed in cover 50. This "L" shape of this embodiment (which can be seen in FIG. 12) may be particularly appropriate for filter applications where a right angle turn is needed.

Figure 16:
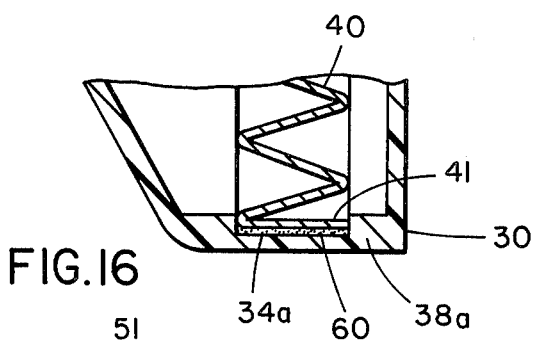
FIG. 16 is a partial section of the filter of FIG. 13 in the direction indicated by 16—16.
Figure 17:
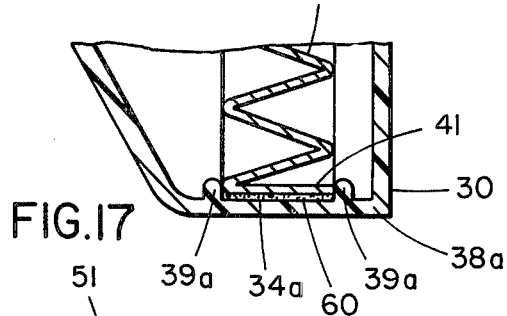
FIG. 17 shows another embodiment of the section of FIG. 16.

FIGS. 16 and 17 for this embodiment are analogous to FIGS. 3 and 4 of the first embodiment in showning alternate constructions for left trough section 34a (and mutatis mutandis right trough section 34a). Similarly, partial sections 14 and 15 of this embodiment are analogous to FIGS. 6 and 7 in showing alternate ways to form bottom trough section 34b.

Figure 18:
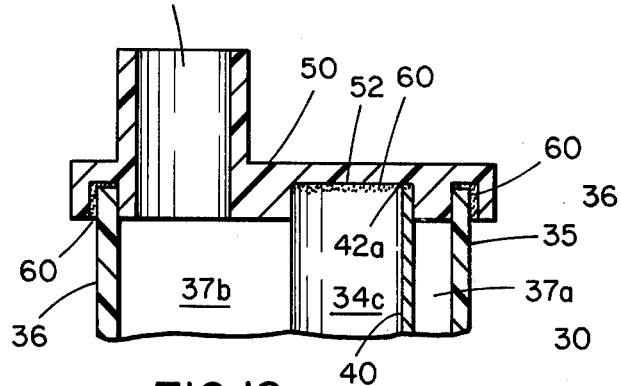
FIG. 18 is a partial section of the filter of FIG. 13 in the direction indicated by 18—18.
Figure 19:
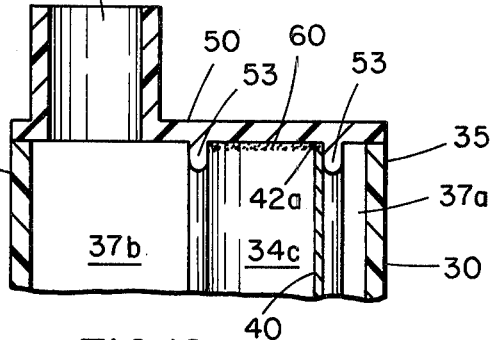
FIG. 19 shows another embodiment of the section of FIG. 18.

The cover configuration 50 shown in FIG. 18 for this second embodiment is somewhat analogous to the alternate cover configuration shown in FIG. 9 for the first embodiment in that it has both a channel 52 to accommodate the filter media's zigzag top edge 42a and a separate outer sealing channel 56 to accommodate container walls 35, 36, 38a, and 38c; some such dual channel construction of the cover is necessitated by the presence of port 51 in the cover. FIG. 19 shows an alternate construction for cover channel 52 (using cover moldings 53) and is somewhat analogous to FIG. 8 except for the presence of cover port 51.

Figure 20:
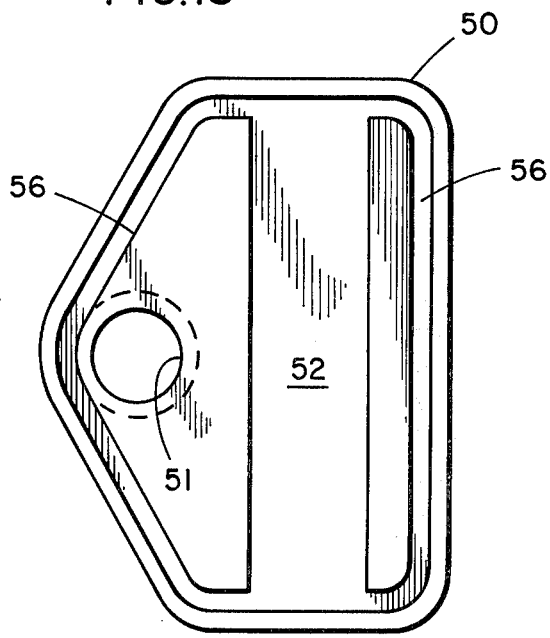
FIG. 20 shows the underside of cover 50 of FIG. 13.
Figure 21:
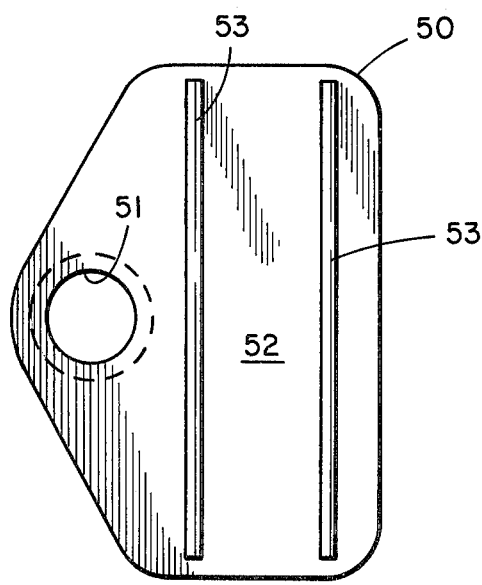
FIG. 21 shows another embodiment of the underside of cover 50 of FIG. 13.

FIG. 20 shows the underside of cover 50 of FIGS. 13 and 18 and illustrates how outer sealing channel 56 joins with cover channel 52. FIG. 21 shown an alternate construction of cover 50 that matches that shown in FIG. 19 in that there is a cover channel 52 formed by cover moldings 53 but no outer sealing channel 56 so that some other means of sealing must be provided, such as ultrasonic welding, to join cover 50 to container walls 35 anrd 36 shown in FIG. 19.

Figure 22:
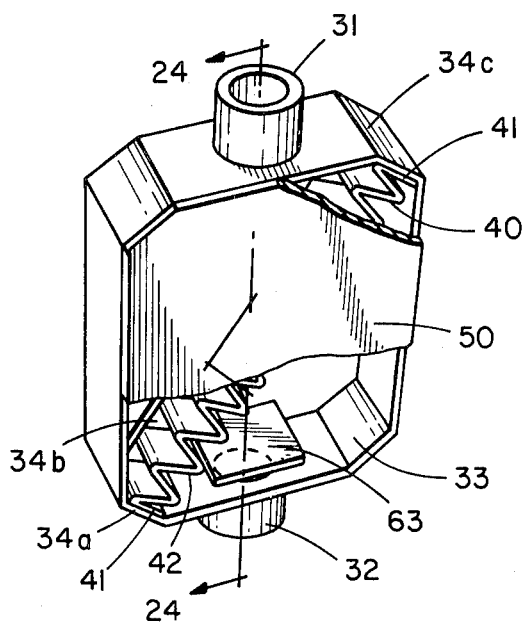
FIG. 22 is a cutaway isometric view of a third embodiment of my filter.
Figure 23:
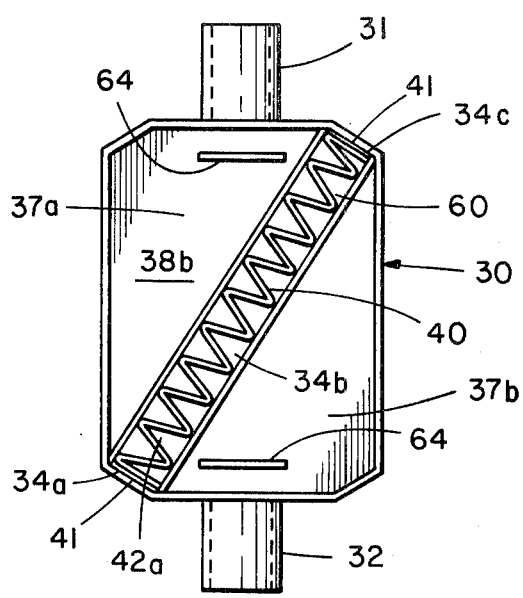
FIG. 23 is a top elevation of the filter of FIG. 22.
Figures 24, 25, 26:
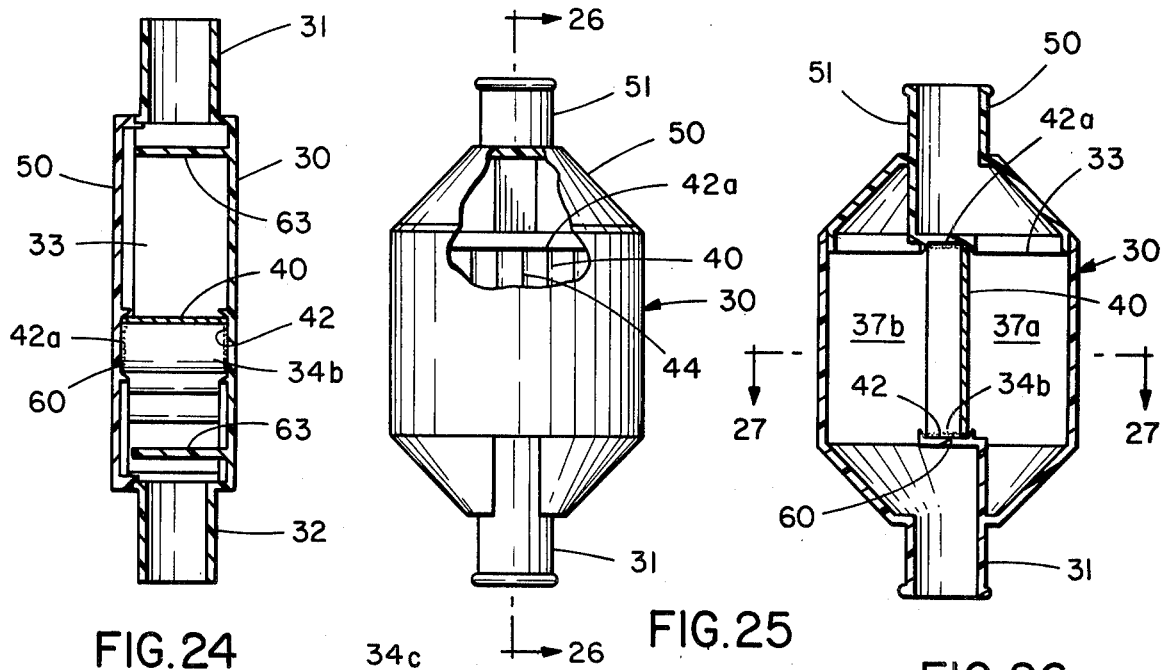
FIG. 24 is a section of the filter of FIG. 22 in the direction indicated by 24—24.
FIG. 25 is a cutaway elevation of a fourth embodiment of my filter.
FIG. 26 is a section of the filter of FIG. 25 in the direction indicated by 26—26.

Yet another embodiment of my filter is shown in FIGS. 22 through 24. This embodiment somewhat differs from the embodiment of FIGS. 1 through 11 in that pleated filter media 40 has been placed diagonally across the substantially rectangular bottom wall 38b of container 30 to provide a long bottom trough section 34b (this design increases the distance between first port 31 and second port 32). Partitions 64 are provided to force a flow pattern between first port 31 and second port 32 that is fully distributed across the additional amount of pleated filter media 40 which can be packed in the long, diagonal trough section 34b.

Figure 27:
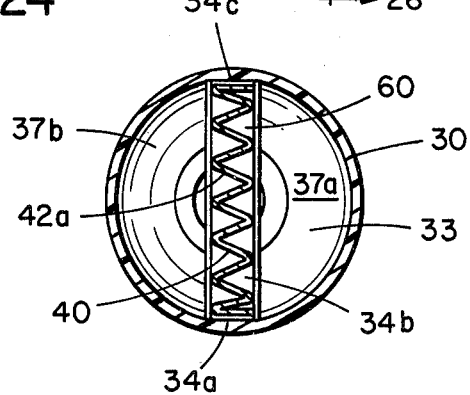
FIG. 27 is a section of the filter of FIG. 26 in the direction indicated by 27—27.

FIGS. 25 through 27 show another construction of my filter in which the pleated filter media 40 is mounted so that pleat lines 44 are parallel to an imaginary line directly connecting first port 31 of container 30 and cover port 51 of cover 50. As can be seen in FIG. 26, the flow between first port 31 and cover port 51 must take substantially right angle turns in plenums 37a and 37b. The geometry of this last configuration allows the exterior for the filter to present a cylindrical appearance (as can be seen in FIG. 25), but FIG. 27 shows that true cylindrical symmetry does not exist in the interior of this construction.

While the various embodiments above differ considerably in their overall geometry, each makes use of a three sided trough section 34a, 34b, and 34c formed in a container 30, the trough so formed mating with a channel 52 in a cover 50; thus each embodiment has the advantages of the simple construction of my invention and can be assembled quickly using the few steps of my new method of constructing filters.

A feature of my invention is that in any of the above embodiments the addition of a simple grate 63 (as shown in FIG. 11) provides an inexpensive and effective way of protecting pleated filter media 40 from being inadvertently punctured by an object inserted into a port such as 31; this grate or barrier can preferably be molded at the same time the corresponding port is formed.

Although the invention has been described and illustrated in detail with reference to particular embodiments, it is understood that the reference to these embodiments is for illustration and example only and is not to be taken as a limitation of the invention; the gist and scope of my invention is to be found in the attached claims.

I claim:

1. A fluid filtering device comprising:
   A. a unitary container having an integral port and defining a cubic volume with at least one open surface;
   B. a continuous three section trough integral within the container and adapted to receive and position three side edges of a pleated filter media element;
   C. an adhesive substantially simultaneously deposited in the three sections of the trough in its gooey, uncured state;
   D. a three dimensional pleated filter element having two flat planar side edges and an upper zigzag side edge and a lower zigzag side edge, three of the filter element's side edges being inserted in the goo containing trough so as to simultaneously seal three edges of the filter element to three corresponding sides of the trough, the seal becoming permanent when the goo has been allowed to cure;
   E. a cover secured to the open surface of the container, the cover having an integral port and a channel mateable with the container's trough for receiving and positioning the remaining unsealed side edge of the filter element; and
   F. sealing means within the channel for providing a fluid type seal between the cover and (1) the container and (2) the remaining unsealed side edge of the filter element.

2. A fluid filtering device comprising:
   A. a unitary container having integral inlet and exhaust ports, the container having one open surface, yet defining a cubic volume;
   B. a continuous three section trough integral within the container and adapted to receive and position three side edges of a pleated filter media element;
   C. an adhesive substantially simultaneously deposited in the three section of the trough in its gooey, uncured state;
   D. a three dimensional pleated filter element having 2 flat planar side edges and an upper zigzag side edge and a lower zigzag side edge, three of the filter element's side edges being inserted in the goo containing trough so as to simultaneously seal three edges of the filter element to three corresponding sides of the trough, the seal becoming permanent when the goo has been allowed to cure;
   E. a cover secured to the open surface of the container, the cover having a channel mateable with the container's trough for receiving and positioning the remaining unsealed side edge of the filter element; and
   F. sealing means within the channel for providing a fluid type seal between the cover and (1) the container and (2) the remaining unsealed side edge of the filter element.

3. A method for making a filter device comprising the steps of:
   A. providing a three dimensional pleated filter element having two flat planar side edges and an upper zigzag side edge and a lower zigzag side edge;
   B. providing a container with a port, one open surface, and an integrally molded continuous trough, the continuous trough having three sections adapted to receive and position three corresponding side edges of the filter element;
C. substantially simultaneously depositing a gooey adhesive in the three sections of the trough;
D. inserting the filter element in the trough after step (C) so as to simultaneously seal three edges of the filter element to three corresponding sections of the trough;
E. allowing the adhesive to cure to a firm state after step (D); and
F. sealing a cover, having an integral port and a channel mateable with the trough, across the container's open surface and to the remaining unsealed side edge of the filter element.

4. A method for making a filter device comprising steps of:
A. providing a three dimensional pleated filter element having two flat planar side edges and an upper zigzag side edge and a lower zigzag side edge;
B. providing a unitary container having integral inlet and exhaust ports, the container having one open surface and yet defining a cubic volume and the container having an integrally molded continuous trough, the continuous trough having three sections adapted to receive and position three corresponding side edges of the filter element;
c. substantially simultaneously depositing a gooey adhesive in the three sections of the trough;
D. inserting the filter element in the trough after step (C) so as to simultaneously seal three edges of the filter element to three corresponding sections of the trough;
E. allowing the adhesive to cure to a firm state after step (D); and
F. sealing a cover having a channel mateable with the trough across the container's open surface and to the remaining unsealed side edge of the filter element.

* * * * *